(12) United States Patent
Gepraegs et al.

(10) Patent No.: US 10,808,838 B2
(45) Date of Patent: Oct. 20, 2020

(54) HYDROSTATIC VALVE ARRANGEMENT, HYDROSTATIC GEAR HAVING THE VALVE ARRANGEMENT, AND HYDROSTATIC DRIVE HAVING THE GEAR

(71) Applicant: Robert Bosch GmbH, Stuttgart (DE)

(72) Inventors: Markus Gepraegs, Ulm (DE); Stefan Joksch, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 16/033,060

(22) Filed: Jul. 11, 2018

(65) Prior Publication Data
US 2019/0072178 A1 Mar. 7, 2019

(30) Foreign Application Priority Data
Sep. 7, 2017 (DE) .......................... 10 2017 215 726

(51) Int. Cl.
*F16H 61/4104* (2010.01)
*F16K 17/00* (2006.01)
(Continued)

(52) U.S. Cl.
CPC ....... *F16H 61/4104* (2013.01); *F16K 17/003* (2013.01); *F16K 17/10* (2013.01); *F15B 7/006* (2013.01); *F15B 7/008* (2013.01); *F15B 21/005* (2013.01); *F15B 21/042* (2013.01); *F15B 21/0423* (2019.01); *F15B 2211/20546* (2013.01); *F15B 2211/20561* (2013.01); *F15B 2211/27* (2013.01); *F15B 2211/611* (2013.01);
(Continued)

(58) Field of Classification Search
CPC ............. F16H 61/4017; F16H 61/4026; F16H 61/4104; F16H 61/4183; F15B 21/005
See application file for complete search history.

(56) References Cited

U.S. PATENT DOCUMENTS

| 5,121,603 A | * | 6/1992 | Widemann | .......... F16H 61/4017 60/447 |
| 7,231,764 B2 | | 6/2007 | Mangano et al. | |

(Continued)

FOREIGN PATENT DOCUMENTS

| DE | 10 2008 060 066 A1 | 6/2010 |
| DE | 10 2017 206 394 A1 | 10/2017 |

*Primary Examiner* — Michael Leslie
*Assistant Examiner* — Matthew Wiblin
(74) *Attorney, Agent, or Firm* — Maginot, Moore & Beck LLP

(57) ABSTRACT

A hydrostatic valve arrangement for flushing pressure medium from a working line of a hydraulic circuit includes a flushing valve with a first flushing connection for connecting to a first working line and an output connection for connecting to a pressure medium sink. The arrangement also includes a pressure valve arranged in a pressure medium flow path of the arrangement from the output connection in the direction of the pressure medium sink. The pressure valve has a valve body on which a force equilibrium is formed. The force equilibrium includes a pressure equivalent that acts on the valve body in a direction that blocks the pressure medium flow path and an opening pressure that acts in a direction that opens the pressure medium flow path and is dependent on the pressure at the output connection. The arrangement further includes an adjusting device for shifting the force equilibrium.

13 Claims, 2 Drawing Sheets

(51) Int. Cl.
*F16K 17/10* (2006.01)
*F15B 7/00* (2006.01)
*F15B 21/0423* (2019.01)
*F15B 21/00* (2006.01)
*F15B 21/042* (2019.01)

(52) U.S. Cl.
CPC . *F15B 2211/613* (2013.01); *F15B 2211/6343* (2013.01); *F15B 2211/7058* (2013.01)

(56) References Cited

U.S. PATENT DOCUMENTS

| | | | |
|---|---|---|---|
| 10,539,130 B2* | 1/2020 | Frick | F04B 1/12 |
| 2007/0079610 A1* | 4/2007 | Lucienne | B60K 17/10 |
| | | | 60/487 |
| 2010/0050624 A1* | 3/2010 | Essig | F16H 61/4017 |
| | | | 60/420 |
| 2014/0150880 A1* | 6/2014 | Rousseau | F04B 49/002 |
| | | | 137/2 |

* cited by examiner

HYDROSTATIC VALVE ARRANGEMENT, HYDROSTATIC GEAR HAVING THE VALVE ARRANGEMENT, AND HYDROSTATIC DRIVE HAVING THE GEAR

This application claims priority under 35 U.S.C. § 119 to patent application no. DE 10 2017 215 726.7, filed on Sep. 7, 2017 in Germany, the disclosure of which is incorporated herein by reference in its entirety.

BACKGROUND

The disclosure relates to a hydrostatic valve arrangement having the features disclosed herein, a hydrostatic gear having the valve arrangement, and a hydrostatic drive having the gear.

Reversible hydrostatic drives, in particular propulsion drives or delivery drives, such as a drive of a concrete pump, for example, have a closed hydraulic circuit. In particular, since the quantity of pressure medium which is conducted in the circuit is comparatively small for the high power densities which can be achieved, it heats up significantly and has to be re-cooled. To this end, heated pressure medium is discharged during operation via a flushing valve. Pressure medium has to be fed into the working lines in an equal amount, supplemented by any leakage flow which occurs in the circuit. Flushing can take place for example in a respective housing of the hydraulic machine. The flushing valve is designed for example as a 3/3-way valve, which is connected by a respective flushing connection to the respective working line and by an output connection to a pressure valve, in particular a pressure limiting valve. If the pressure in both working lines is the same or virtually the same, the flushing valve is located in a centered blocking position, in which flushing does not occur. If there is sufficient pressure difference between the working lines, which is the case when operating under a load, the flushing valve is switched accordingly to a flushing position in which, for flushing purposes, the working line with the lower pressure is connected to a pressure medium sink via the pressure valve. A feed pump for replacing the flushed pressure medium volume and other leakage is essentially provided. This delivers into the working line on the low-pressure side. In this case, the problem essentially arises that the feed pump has to be protected against overload, for example when the flushing output is closed, i.e. when the flushing valve is blocked. To this end, a pressure limiting valve is connected to the pressure connection of the feed pump.

During operation, situations arise in which the dynamics of the components involved can lead to an undesired, flushing-induced loss of pressure on the low-pressure side of the hydraulic circuit. This is the case for example when the displacement volume of one of the hydraulic machines is adjusted from a positive value, for example, to a value beyond a neutral or zero position in which the displacement volume is equal to zero. In axial piston machines having an adjustable swash plate, this is the case for a so-called "swivel-through" or "reversing" of the swash plate. In this case, the adjustment dynamics of the hydraulic machine are so high that the duration of this procedure is in the millisecond range. However, the valve body of the flushing valve is unable to follow these adjustment dynamics and does not reach its blocking position anywhere near as quickly as the swash plate reaches is zero or neutral position. This can result in a drop in pressure on the currently flushed low-pressure side of the hydraulic circuit. This is linked to a risk of cavitation and damage to the hydraulic circuit and the connected components.

Consequently, it is often a requirement in a closed hydraulic circuit that the flushing by the flushing valve can be overridden or shut off. In a solution disclosed by the published document U.S. Pat. No. 7,231,764 B2, a pressure limiting valve is connected downstream of the flushing valve. As is also the case in many other solutions of the prior art, said pressure limiting valve fundamentally has the task of maintaining the pressure on the low-pressure side of the hydraulic circuit when flushing occurs via the flushing valve. If the pressure limiting valve is closed, flushing does not take place. If it is open, then flushing takes place. In this case, a valve body of the pressure limiting valve is acted upon in the closing direction by a spring and the pressure at the output of the flushing valve. The valve body is acted upon by the same pressure in the opening direction. An additional valve is now provided, which may be actuated depending on an operating parameter P of the circuit and via which the load pilot line conducting the pressure at the output connection of the flushing valve to the closing side of the valve body can be connected to a pressure medium sink. When this additional valve is opened, the closing force of this pressure on the valve body of the pressure limiting valve is eliminated. On the other hand, when the additional valve is closed, the closing force of the spring is reinforced, or the pressure acting in the opening direction is compensated. The pressure limiting valve mounted downstream of the flushing valve can thus be held closed according to requirements and regardless of the pressure ratios of the working lines, whereby flushing is prevented. The disadvantage of this is that this only constitutes a binary option and, during the flushing procedure, the quantity of flushed pressure medium is either the maximum or equal to zero.

SUMMARY

In contrast, the disclosure is based on the object of providing a hydrostatic valve arrangement for flushing the hydraulic circuit, via which a finer control between the states "flushing" and "flushing shutoff" is possible. Added to this are the objects of providing a hydrostatic gear having the valve arrangement and a hydrostatic drive having the gear.

The first object is achieved by a hydrostatic valve arrangement having the features disclosed herein, the second by a hydrostatic gear having the valve arrangement, and the third by a hydrostatic drive having the hydrostatic gear.

Advantageous further developments of the disclosure are described in the respective subclaims.

A hydrostatic valve arrangement for flushing pressure medium from at least one working line of a hydraulic circuit has a flushing valve having a first flushing connection. Said first flushing connection is provided for connecting to a first working line of the circuit. The valve arrangement furthermore has an output connection for connecting to a pressure medium sink. In this case, a pressure valve—in particular a pressure limiting valve —, on the valve body of which a force equilibrium is formed, is arranged in a pressure medium flow path of the arrangement from the output connection in the direction towards the pressure medium sink (T), in particular for maintaining a pressure at the output connection during the flushing procedure. This force equilibrium includes at least one pressure equivalent, in particular the spring force of a spring, which acts on the valve body in the direction of a blocking or increasing throttling of the pressure medium flow path, and an opening pressure, which acts in the direction of an opening or decreasing throttling of the pressure medium flow path and is dependent on the pressure at the output connection. Moreover, for overriding the flushing procedure, an adjusting device, in particular a pressure adjusting device, is provided for shifting the force equilibrium. According to the disclosure, the adjusting device is designed in such a way that the opening pressure may be adjusted thereby, in particular in steps and/or continuously.

An opening cross-section of the pressure valve and the pressure in the working line to be flushed can thus be controlled more finely so that flushing can take place not only in a binary way—with a maximum flushing flow or none at all—but according to requirements.

In a further development, the flushing valve is formed as a directional valve having at least three connections and three positions.

In a further development, the adjusting device is designed as a pressure valve, in particular as a pressure regulating valve, via which the opening pressure may be regulated, or as a pressure reducing valve, via which the pressure at the output connection may be reduced to the opening pressure.

In a further development, the adjusting device is designed in such a way that the opening pressure may be adjusted thereby to a value of a pressure interval which is limited by the pressure at the output connection and a pressure of the pressure medium sink.

In a further development, the adjusting device is designed in such a way that the opening pressure may be adjusted thereby to a value which is greater than the pressure equivalent or equal to the pressure equivalent or less than the pressure equivalent.

In a further development, the pressure equivalent is less than or equal to the maximum possible pressure at the output connection.

In a further development, the flushing valve has a second flushing connection for connecting to a second working line of the circuit. In this case, a valve body of the flushing valve has a blocking position, in particular a spring-centered blocking position, in which both flushing connections are fluidically separated from the output connection. It furthermore has a first flushing position in which the first flushing connection is connected to the output connection and the second flushing connection is separated from the output connection. In a second flushing position, the second flushing connection is connected to the output connection and the first flushing connection is separated from the output connection. The valve body is loaded in the direction of the first flushing position by the pressure at the second flushing connection and in the direction of the second flushing position by the pressure at the first flushing connection.

In a further development of the valve arrangement, a throttle or an orifice with a constant or with a variable throttle cross-section is arranged in the pressure medium flow path between the output connection and the pressure valve. Regulation of the flushing pressure medium volume flow can take place thereby. The actuation of the throttle or orifice can be provided electrically, in particular electromagnetically, or hydraulically and electromagnetically.

In a further development, the valve body of the flushing valve, the pressure valve, the pressure adjusting device and the throttle, or a sub-group thereof, are compactly arranged in a common valve housing, in particular a valve block or a valve disk. It is of course alternatively possible to provide a separate valve housing or sub-groups of valve housings, which are preferably flanged together.

A hydrostatic gear has two hydraulic machines, which are fluidically connected to one another via a first working line and a second working line in a closed hydraulic circuit. The gear moreover has a feed pump for feeding pressure medium into at least one of the working lines, and also a valve arrangement, which is designed according to at least one aspect of the description above. In this case, at least the first flushing connection is fluidically connected to the first working line.

In a further development, at least one of the hydraulic machines of the gear has a variable displacement volume.

In a further development of the gear, it has a control device, via which the adjusting device may be controlled for adjusting the opening pressure depending on an operating state of the gear, in particular a pressure medium temperature and/or a displacement volume of one of the hydraulic machines and/or an adjustment in a displacement volume of one of the hydraulic machines and/or a change in pressure in the working lines and/or a torque reversal at one of the hydraulic machines.

A hydrostatic drive has a hydrostatic gear which is designed according to one of the aspects above. It moreover has a drive machine which is connected to a first of the hydraulic machines for transmitting a drive torque, and an output which is connected to a second of the hydraulic machines for transmitting an output torque.

In a further development, a delivery drive is formed by the drive. For example, the output is then an input shaft of a pump, in particular a concrete pump.

In another further development, a propulsion drive is formed by the drive. For example, the output is then an axle or a wheel or a chain of a vehicle or a mobile machine. The mobile machine is in particular a harvester, for example a combine harvester or the like.

BRIEF DESCRIPTION OF THE DRAWINGS

Two exemplary embodiments of a hydrostatic gear according to the disclosure are illustrated in the drawings. The disclosure is now explained in more detail with reference to the figures of these drawings, in which.

DETAILED DESCRIPTION

Figure 1:
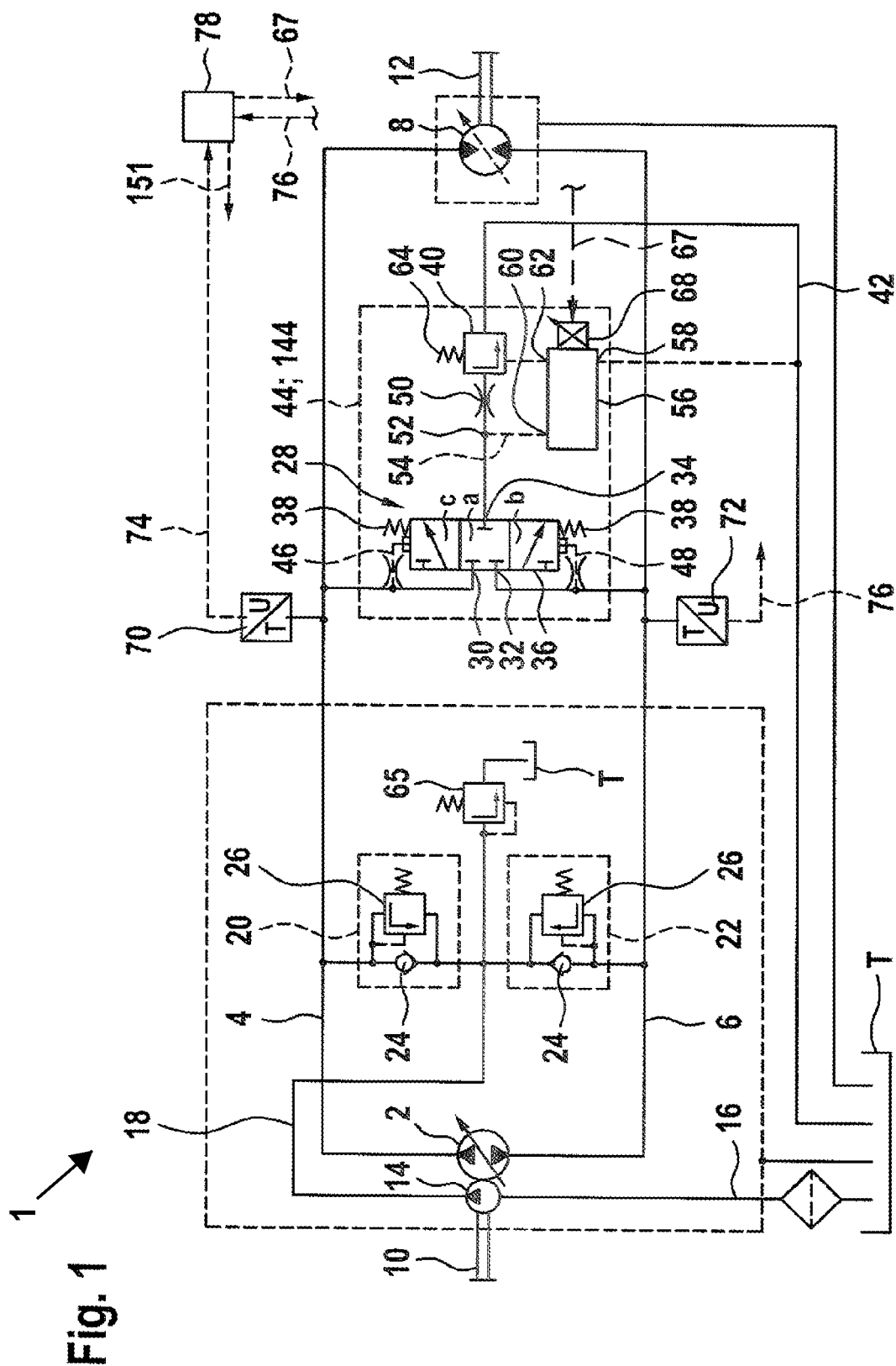
FIG. 1 shows a hydraulic circuit diagram of a hydrostatic gear according to a first exemplary embodiment.

According to FIG. 1, a hydrostatic gear 1, which is provided for use in a propulsion drive or in a delivery drive according to the description above, has a first hydraulic machine 2 and a second hydraulic machine 8, connected thereto via a first working line 4 and a second working line 6 in a closed hydraulic circuit. In the exemplary embodiment shown, the first hydraulic machine 2 or hydraulic pump 2 is constructed as an axial piston machine in a swash plate design with an adjustable displacement volume. It is reversible, that is to say that its swash plate determining the delivery volume can be adjusted on both sides of a neutral or zero position in which its delivery volume is zero so that, with a constant drive torque of the first hydraulic machine 2, a change in pressure in the working lines 4, 6, and therefore a reversal of the direction of rotation at the second hydraulic machine, takes place. For adjusting its displacement volume, the first hydraulic machine 2 has a hydrostatic adjusting device (not illustrated).

The first hydraulic machine 2 may be coupled to a drive machine, for example a diesel engine, via a drive shaft 10. The second hydraulic machine 8 may be coupled to an output, for example to a concrete pump or to a wheel, a chain or an axle, via a drive shaft 12. A feed pump 14 formed as a hydrostatic gear machine with a constant displacement volume is connected to the drive shaft 10 of the first hydraulic machine 2. The feed pump can alternatively be constructed with an adjustable displacement volume. It goes without saying that an alternative design can be chosen for the gear machine, for example in the form of a vane-type machine. This is provided in particular for an embodiment with an adjustable displacement volume. The feed pump 14 has a suction line 16, which is connected to a tank T. On the pressure side, it has a pressure medium feed line 18 to which two valve units 20, 22 are connected, which are each connected to one of the working lines 4, 6. Each of the valve units 20, 22 has a non-return valve 24 opening to the respective working line 4, 6 and a pressure limiting valve 26 limiting the pressure in the respective working line 4, 6.

The hydrostatic gear furthermore has a flushing valve 28 designed as a 3/3-way valve and having a first flushing connection 30, a second flushing connection 32 and an output connection 34. The first flushing connection 30 is fluidically connected to the first working line 4 and the second flushing connection 32 is fluidically connected to the second working line 6. A valve body 36 of the flushing valve 28 has a blocking position a, which is centered by two springs 38 and in which the connections 30, 32, 34 are separated from one another. Not illustrated in this case is a negative overlap of the valve body 36 with control edges of a valve housing of the flushing valve 28, via which the respective pressure medium connection of the flushing connections 30, 32 to the output connection 34 is controlled. In this case, the negative overlap enables a low leakage flow from the two working lines 4, 6 to the output connection 34. Furthermore, the flushing valve 28 has a first flushing position b in which the first flushing connection 30 is connected to the output connection 34 and the second flushing connection 32 is separated from the output connection 34. In an equivalent manner to this, the flushing valve 28 has a second flushing position c in which the second flushing connection 32 is connected to the output connection 34 and the first flushing connection 30 is separated from the output connection 34.

The switching of the valve body 36, and therefore the respective pressure medium connection of the flushing connections 30, 32 to the output connection 34, takes place depending on the pressures in the working lines 4, 6. For this purpose, the valve body 36 is loaded in the direction of the first flushing position b by pressure at the second flushing connection 32, or the second working line 6, via a pressure pilot line 48 and in the direction of the second flushing position c by the pressure at the first flushing connection 30, or the first working line 4, via a pressure pilot line 46.

The output connection 34 is connected to a pressure valve designed as a pressure limiting valve 40. This is in turn connected to a pressure medium sink, the tank T, via a flushing line 42. The flushing valve 28 and the pressure or pressure limiting valve 40 are components of a respective hydrostatic valve arrangement 44; 144, which is explained in more detail in FIG. 2 and in FIG. 3.

An orifice or throttle 50 is arranged in a pressure medium flow path from the output connection 34 to the pressure limiting valve 40. Between the orifice 50 and the output connection 34, the pressure medium flow path has a tap 52. Via a pressure pilot line 54 which branches there, a pressure adjusting device 56 is connected to the output connection 34. This pressure adjusting device has a tank connection 58, which is connected to the flushing line 42, a pressure input 60 which is connected to the pressure pilot line 54 and a pressure output 62. This latter is fluidically connected to an active surface on the valve body of the pressure limiting valve 40, which active surface acts in the opening direction. A pressure equivalent in the form of a spring 64 acts in the opposite direction on the valve body of the pressure limiting valve 40 in a closing manner.

A description of the operation of the hydrostatic gear 1 and the hydrostatic valve arrangement 44 incorporated therein follows.

In the exemplary embodiment shown, the gear 1 is a component of a propulsion drive (not illustrated), wherein a drive machine (not illustrated), in particular a diesel engine, is coupled to the drive shaft 10 and an output (not illustrated), in particular a multi-wheel axle of the propulsion drive, is coupled to the drive shaft 12.

It will be assumed that the propulsion drive is in the forward driving mode. Accordingly, the first hydraulic machine 2 (hydraulic pump) delivers pressure medium into the first working line 4, so that a load pressure or high pressure is established there. The pressure medium is depressurized via the second hydraulic machine 8 and hydraulic power is converted into mechanical shaft power, which is transmitted to the wheels of the propulsion drive via the drive shaft 12. The pressure in the second working line 6 is therefore a low pressure.

The feed pump 14 "seated" on the drive shaft 10 delivers pressure medium to the valve units 20, 22 via the pressure medium feed line 18. Owing to the high pressure in the first working line 4, the associated non-return valve 24 does not open. Instead, pressure medium is delivered into the second working line 6 via the non-return valve 24 associated with the second working line 6. According to FIG. 1, said second working line is protected against overload of the feed pump 14 via a pressure limiting valve 65.

The pressures of the working lines 4, 6 are conducted to the respective active surface of the valve body 36 of the flushing valve 28 via the pressure pilot lines 46, 48. Accordingly, this valve body 36 shifts in the direction of the second flushing position c, in which the second working line 6 is connected to the output connection 34 via the second flushing connection 32. In principle, the flushing valve 28 is therefore switched so that pressure medium can be flushed from the second working line 6 conducting the low pressure. Owing to the shifted valve body 36, the (low) pressure of the second working line 6 is therefore applied to the output connection 34. It is likewise applied to the pressure input 60 of the pressure adjusting device 56 and to the pressure medium input of the pressure limiting valve 40 via the tap 52 and the pressure pilot line 54. The pressure adjusting device 56 in the exemplary embodiment shown is electromagnetically controllable. To this end, it is signal-connected to a control device (not illustrated) of the hydrostatic gear 1 via a signal line 67.

In the exemplary embodiment shown, the pressure adjusting device 56 is designed in such a way that the pressure at the pressure output 62 is fluidically connected thereby to the tank connection 58 in the absence of a control via the signal line 67. Therefore, in this case, the pressure in the tank T acts in the direction of an opening position of the pressure limiting valve 40. Since this is naturally lower than the pressure equivalent of the spring 64, the pressure limiting valve 40 remains closed regardless of the pressures which are actually applied in the working lines 4, 6. Flushing is then generally prevented.

A pressure medium temperature is constantly communicated to the control unit 78 via signal lines 74 and 76 according to FIG. 1 the by temperature detection units 70, 72 which are connected to the respective working line 4, 6. In the assumed operating state, an operating temperature of the pressure medium is not yet reached, which also means that re-cooling is as yet unnecessary. Therefore, the control unit 78 decides via a procedure stored therein for execution purposes that the flushing according to the description above has to be prevented. Accordingly, the electromagnet 68 is not (yet) energized via the signal line 67. On the other hand, if the operating temperature has been reached, the electromagnet 68 is energized via the control unit 78 according to the procedure.

Figure 2:
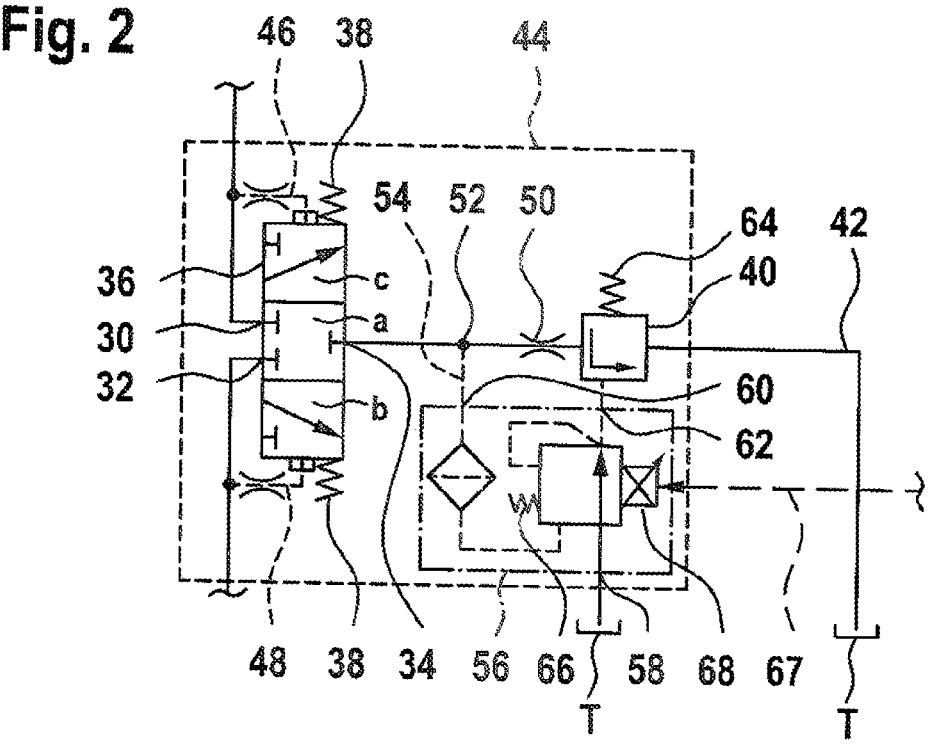
FIG. 2 shows an inventive hydrostatic valve arrangement according to a first exemplary embodiment for the gear according to FIG. 1.

FIG. 2 shows the valve arrangement 44 according to FIG. 1 in a detailed illustration which shows that the pressure adjusting device 56 is designed as a pressure regulating valve. The pressure regulating valve 56 has the said connections 58, 60, 62. In the end position according to FIG. 2, in which the electromagnet is not (yet) energized, the tank connection 58 is connected to the pressure output 62 and the pressure input is blocked. In the direction of this end position, a spring 66 and the pressure, i.e. regulated pressure, applied at the pressure output 62 act on the valve body of the pressure regulating valve 56. In an opposite end position of the valve body of the pressure regulating valve 56, the pressure input 60 is connected to the pressure output 62. In this direction, the electromagnet 68, which may be energized variably via the signal line 67, acts on the valve body.

Therefore, as already mentioned, in the absence of energization via the signal line 67, the pressure input 60 is blocked via the pressure regulating valve 56 and the pressure output 62 is connected to the tank T. Therefore, the closing spring 64 of the pressure limiting valve 40 does not apply an opening force to the valve body thereof. The pressure limiting valve 40 is then blocked and flushing cannot take place via the output connection 34 into the flushing line 42. On the other hand, with a sufficient and increasing energization of the electromagnet 68 of the pressure regulating valve 56, the pressure input 60 is increasingly connected to the pressure output 62 and its connection to the tank T is throttled, whereby the pressure at the output connection 34, and therefore the pressure of the low pressure line 4 or 6, acts increasingly on the valve body of the pressure limiting valve 40 in the opening direction.

Flushing is therefore enabled as soon as the opening pressure at the pressure output 62 can overcome the force of the spring 64. A force equilibrium is formed on the valve body of the pressure limiting valve 40 by the pressure at the pressure output 62 and the opposing pressure equivalent of the spring 64, which is dependent on the stroke of the valve body of the pressure limiting valve 40, as a function of which force equilibrium an opening cross-section of the pressure limiting valve 40 is established. Compared to the prior art, the opening cross-section of the pressure limiting valve 40 can therefore be controlled continuously. During the flushing procedure, the pressure in the working line conducting the low pressure is thus continuously adjustable via the pressure limiting valve 40 in conjunction with the pressure regulating valve 56. As can be seen in FIG. 2, the electromagnet 68 constitutes a set value indicator for the pressure regulating valve 56. The set value of the pressure to be regulated at the pressure output 62 can be pre-set via the variable energization of said electromagnet by means of the signal line 67. The greater the drop in the energization of the electromagnet 68, the greater the shift of the valve body of the pressure regulating valve 56 towards the pressure medium connection of the pressure input 60 to the pressure output 62. A higher opening pressure is therefore established on the valve body of the pressure limiting valve 40. Since the pressure equivalent of the spring 64 is dependent on the stroke of the valve body of the pressure limiting valve 40, the said valve body can thus be controlled to adopt various opening positions as already mentioned.

With an energized pressure adjusting device 56, the force equilibrium acting on the valve body of the pressure limiting valve 40 therefore corresponds to that which is known from the prior art, since the pressure applied at the output connection 34 is genuinely active in the opening direction at the pressure limiting valve 40. If the pressure acting in an opening manner at the output connection 34 is sufficient for overcoming the force of the spring 64 and the temperature detecting devices 70, 72 signal a sufficient pressure medium temperature, the flushing via the flushing valve 28 into the flushing line 42 takes place in driving mode.

It will now be assumed that an operator or another control device signals to the control device 78 that a change in the driving direction of the propulsion drive is stipulated. Accordingly a control signal is issued to the second hydraulic machine 2 for swiveling its swash plate beyond the zero position to the other side of a swivel angle interval in each case. This is linked to a change in pressure in the working lines 4, 6 wherein, in the new end state, the second working line 6 will conduct the high pressure and the first working line 4 will conduct the low pressure. The adjustment speed of the swash plate is very high compared to the control speed of the valve body 36 of the flushing valve 28.

According to the disclosure, to rule out a pressure drop on the flushed low pressure side of the hydraulic circuit 4, 6 when the swash plate swivels through the zero position, the flushing is overridden during this procedure in that the energization of the electromagnet 68 is interrupted temporarily—during the swivel-through—via the control device 78. The pressure limiting valve 40 therefore closes and the drop in pressure and a cavitation are prevented. In this time, the feed pump delivers towards the closed pressure limiting valve 40 and is protected against overload via the pressure limiting valve 65.

Figure 3:
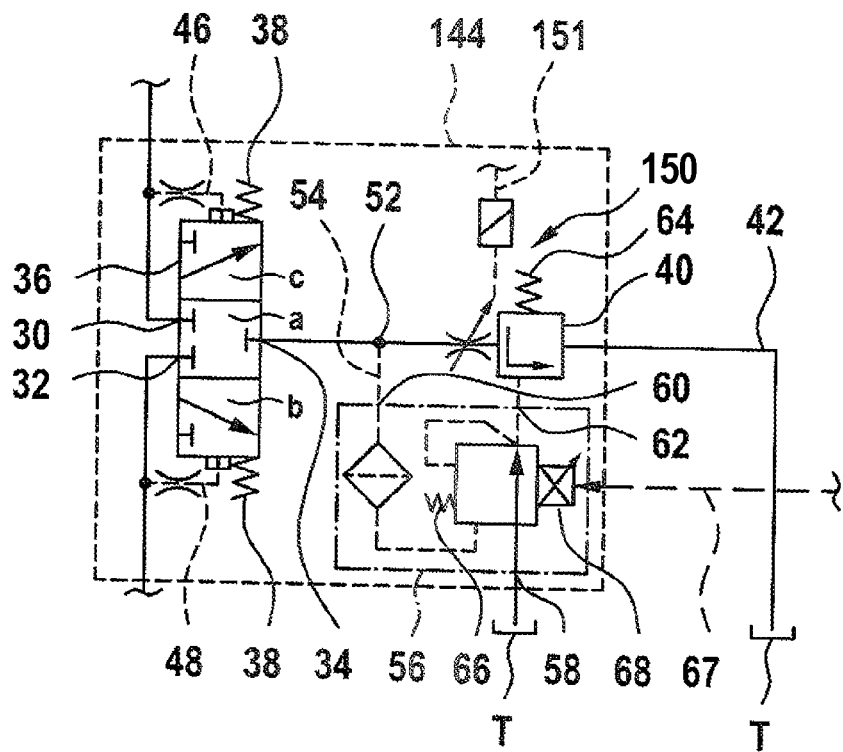
FIG. 3 shows an inventive hydrostatic valve arrangement according to a second exemplary embodiment for the gear according to FIG. 1.

FIG. 3 shows a second exemplary embodiment of a hydrostatic valve arrangement 144, which corresponds substantially to that according to FIG. 2. Deviating from this, an orifice 150 with a variable, in particular electromagnetically variable, cross-section via signal line 151 is now provided instead of an orifice with a constant cross-section. Therefore, controlled via the orifice 150 and via the control unit 78, the flushing pressure medium volume flow discharged via the flushing line 42 can be finely controlled. Thus, in addition to "shutting off" the flushing, a flushing quantity can be adapted to the actual flushing requirement in a finely controlled manner. This results in an economizing of energy and an increase in efficiency of the hydrostatic gear as a whole.

The holding pressure with which the pressure limiting valve 40 specifies the pressure in the working line to be flushed may be regulated via the pressure regulating valve 56.

Deviating from the exemplary embodiments shown, in which the non-energization of the pressure adjusting device 56 results in a shutting-off of the flushing procedure, the pressure adjusting device 56 can be designed inversely so that the shutting-off takes place when the pressure adjusting device 56 is energized.

A cooler or re-cooler or heat exchanger, which is self-evidently present and cools the pressure medium discharged via the pressure limiting valve 40 and releases it into the tank T or a pressure medium reservoir connected to the suction line 16, is not shown.

Disclosed is a hydrostatic valve arrangement for flushing a hydraulic circuit, in particular a closed hydraulic circuit, having a logic valve which is capable of selecting one of the working lines of the circuit for flushing, which working line has the lower pressure, and having a pressure valve which is connected downstream and via which a pressure may be maintained in the selected working line during flushing. In this case, an adjusting device is provided, via which a pressure acting on the pressure valve in an opening manner may be adjusted, in particular regulated.

Furthermore disclosed are a hydrostatic gear having such a valve arrangement, a hydrostatic drive having such a gear and a working machine or a mobile working machine having the drive.

LIST OF REFERENCE SIGNS

1 Hydrostatic gear
2 First hydraulic machine
4 First working line
6 Second working line
8 Second hydraulic machine
10, 12 Drive shaft
14 Feed pump
16 Suction line
18 Pressure medium feed line
20, 22 Valve unit
24 Non-return valve
26 Pressure limiting valve
28 Flushing valve
30 First flushing connection
32 Second flushing connection
34 Output connection
36 Valve body
38 Spring
40 Pressure valve
42 Flushing line
44; 144 Hydrostatic valve arrangement
46, 48 Pressure pilot line
50; 150 Orifice
52 Tap
54 Pressure pilot line
56 Pressure adjusting device
58 Tank connection
60 Pressure input
62 Pressure output
64 Spring
65 Pressure limiting valve
66 Spring
67 Signal line
68 Electromagnet
70, 72 Temperature detection unit
74, 76 Signal line
78 Control unit
T Tank
a Blocking position
b First flushing position
c Second flushing position

What is claimed is:

1. A hydrostatic valve arrangement for flushing pressure medium from at least one working line of a hydraulic circuit, comprising:
   a flushing valve that includes a first flushing connection connected to a first working line of the circuit, and an output connection configured to connect to a pressure medium sink;
   a pressure valve arranged in a pressure medium flow path of the arrangement between the output connection and the pressure medium sink, the pressure valve having a valve body acted on in a closing direction by at least one pressure equivalent and in an opening direction via a pilot line that is tapped off the pressure medium flow path between the output connection and the pressure valve by an opening pressure that is dependent on a pressure at the output connection such that a force equilibrium is formed on the valve body; and
   an adjusting device comprising a pressure regulating valve arranged in the pilot line and configured to shift the force equilibrium by adjusting the opening pressure acting on the valve body in the opening direction,
   wherein the pressure regulating valve is configured to adjust the opening pressure as a function of the opening pressure.

2. The valve arrangement according to claim 1, wherein the pressure regulating valve is configured to adjust the opening pressure in steps or continuously.

3. The valve arrangement according to claim 1, wherein the pressure regulating valve is configured to adjust the opening pressure to a value within a pressure interval that is limited by an output pressure at the output connection and a sink pressure of the pressure medium sink.

4. The valve arrangement according to claim 1, wherein the pressure regulating valve is configured to adjust the opening pressure to a value that is greater than or equal to or less than the pressure equivalent.

5. The valve arrangement according to claim 1, wherein the pressure equivalent is less than or equal to an output pressure at the output connection.

6. The valve arrangement according to claim 1, wherein:
   the flushing valve has a second flushing connection configured to connect to a second working line of the circuit,
   a flushing valve body of the flushing valve has a blocking position in which both the first and second flushing connections are fluidically separated from the output connection,
   the valve body has a first flushing position in which the first flushing connection is connected to the output connection and the second flushing connection is separated from the output connection,
   the flushing valve has a second flushing position in which the second flushing connection is connected to the output connection and the first flushing connection is separated from the output connection, and
   the flushing valve body is loaded in the direction of the first flushing position by a second flushing pressure at the second flushing connection and in the direction of the second flushing position by a first flushing pressure at the first flushing connection.

7. The valve arrangement according to claim 1, further comprising:
   a throttle or an orifice with a constant or with a variable throttle cross-section arranged in the pressure medium flow path between the pilot line and an inlet of the pressure valve.

8. The valve arrangement according to claim 1, wherein a flushing valve body of the flushing valve, the pressure valve, the pressure regulating valve, and a throttle, or a sub-group thereof, are arranged in a common valve housing.

9. The valve arrangement according to claim 8, wherein the common valve housing is a valve block or a valve disk.

10. A hydrostatic gear, comprising:
two hydraulic machines, which are fluidically connected to one another via a first working line and a second working line in a closed hydraulic circuit;
a feed pump configured to feed pressure medium into at least one of the working lines; and
a valve arrangement configured to flush pressure medium from the first working line, the valve arrangement including:
a flushing valve that includes a first flushing connection connected to the first working line, and an output connection configured to connect to a pressure medium sink,
a pressure valve arranged in a pressure medium flow path of the arrangement between the output connection and the pressure medium sink, the pressure valve having a valve body acted on in a closing direction by at least one pressure equivalent and in an opening direction via a pilot line that is tapped off the pressure medium flow path between the output connection and the pressure valve by an opening pressure that is dependent on a pressure at the output connection such that a force equilibrium is formed on the valve body, and
an adjusting device comprising a pressure regulating valve arranged in the pilot line and configured to shift the force equilibrium by adjusting the opening pressure acting on the valve body in the opening direction, wherein the pressure regulating valve is configured to adjust the opening pressure as a function of the opening pressure.

11. The gear according to claim 10, wherein at least one of the two hydraulic machines has a variable displacement volume.

12. The gear according to claim 10, further comprising a control device configured to control the pressure regulating valve to adjust the opening pressure depending on one or more of a pressure medium temperature, a displacement volume of one of the hydraulic machines, an adjustment in a displacement volume of one of the hydraulic machines, a change in pressure in the working lines, and a torque reversal at one of the hydraulic machines.

13. A hydrostatic drive, comprising:
a hydrostatic gear including:
two hydraulic machines, which are fluidically connected to one another via a first working line and a second working line in a closed hydraulic circuit,
a feed pump configured to feed pressure medium into at least one of the working lines, and
a valve arrangement configured to flush pressure medium from the first working line, the valve arrangement including:
a flushing valve that includes a first flushing connection connected to the first working line, and an output connection configured to connect to a pressure medium sink,
a pressure valve arranged in a pressure medium flow path of the arrangement between the output connection and the pressure medium sink, the pressure valve having a valve body acted on in a closing direction by at least one pressure equivalent and in an opening direction by via a pilot line that is tapped off the pressure medium flow path between the output connection and the pressure valve an opening pressure that is dependent on a pressure at the output connection such that a force equilibrium is formed on the valve body, and
an adjusting device comprising a pressure regulating valve arranged in the pilot line and configured to shift the force equilibrium by adjusting the opening pressure acting on the valve body in the opening direction, wherein the pressure regulating valve is configured to adjust the opening pressure as a function of the opening pressure;
a drive machine which is connected to a first of the hydraulic machines and configured to transmit a drive torque; and
an output which is connected to a second of the hydraulic machines and configured to transport an output torque.

* * * * *